United States Patent
Kirchmair et al.

(10) Patent No.: US 12,345,004 B2
(45) Date of Patent: Jul. 1, 2025

(54) CRAWLER VEHICLE AND CONTROL METHOD OF SAID VEHICLE

(71) Applicant: PRINOTH S.P.A., Vipiteno (IT)

(72) Inventors: Martin Kirchmair, Vipiteno (IT); Alberto Paoletti, Vipiteno (IT); Alex Wood, Grand Junction, CO (US); Jean Francois Labbe, Granby (CA)

(73) Assignee: PRINOTH S.P.A., Vipiteno (IT)

( * ) Notice: Subject to any disclaimer, the term of this patent is extended or adjusted under 35 U.S.C. 154(b) by 311 days.

(21) Appl. No.: 17/968,419

(22) Filed: Oct. 18, 2022

(65) Prior Publication Data
US 2023/0125266 A1   Apr. 27, 2023

(30) Foreign Application Priority Data
Oct. 21, 2021  (IT) ................... 102021000027110

(51) Int. Cl.
  *E01H 4/02*  (2006.01)
  *B62D 55/06*  (2006.01)

(52) U.S. Cl.
  CPC ............ *E01H 4/02* (2013.01); *B62D 55/06* (2013.01)

(58) Field of Classification Search
  CPC .................................. E01H 4/02; B62D 55/06
  See application file for complete search history.

(56) References Cited

U.S. PATENT DOCUMENTS

| | | | |
|---|---|---|---|
| 5,142,800 A | 9/1992 | Hales et al. | |
| 6,637,529 B2* | 10/2003 | Suzuki | B62D 11/183 180/6.66 |
| 11,512,447 B2* | 11/2022 | Myers | E02F 3/431 |
| 2003/0051376 A1* | 3/2003 | Lassonde | E01H 4/02 37/348 |
| 2003/0070325 A1* | 4/2003 | Grobler | E01H 4/02 37/219 |
| 2004/0144000 A1* | 7/2004 | Kanzler | E01H 4/02 37/196 |
| 2012/0305321 A1* | 12/2012 | Wagger | B60G 5/01 701/37 |

(Continued)

FOREIGN PATENT DOCUMENTS

| | | | | |
|---|---|---|---|---|
| AT | 510622 A1 | 5/2012 | | |
| EP | 1405782 A1 * | 4/2004 | ............ | B62D 11/02 |
| WO | WO 2009056577 A1 | 5/2009 | | |

OTHER PUBLICATIONS

Italian Search Report and Written Opinion for Application No. IT202100027110 dated Jun. 2, 2022.

*Primary Examiner* — Aniss Chad
*Assistant Examiner* — Christopher George Fees
(74) *Attorney, Agent, or Firm* — Neal, Gerber & Eisenberg, LLP (57) ABSTRACT

A crawler vehicle has a frame; a working tool hinged at the back of the frame around a yaw axis; and actuation system, which is configured to act between the working tool and the frame; and a control device, which is configured to calculate a value of the steering radius of the crawler vehicle and to control the actuation system so as to selectively: enable the working tool to freely oscillate about the yaw axis when the calculated value of the steering radius is comprised within a reference interval; keep the position of the working tool blocked with respect to the frame when the calculated value of the steering radius is outside the reference interval.

17 Claims, 5 Drawing Sheets

(56) References Cited

U.S. PATENT DOCUMENTS

2016/0318423 A1* 11/2016 Thibault ................... B60N 2/14
2018/0072359 A1*  3/2018 Steiner .................. B62D 55/286
2019/0054823 A1*  2/2019 Kirchmair ............. E02F 9/2016

* cited by examiner

CRAWLER VEHICLE AND CONTROL METHOD OF SAID VEHICLE

PRIORITY CLAIM

This application claims the benefit of and priority to Italian Patent Application No. 102021000027110, filed on Oct. 21, 2021, the entire contents of which is incorporated herein by reference.

TECHNICAL FIELD

The present disclosure relates to a crawler vehicle, in particular used for the preparation of ski runs.

Generally speaking, a crawler vehicle comprises a frame; a pair of motorized tracks; and a working tool coupled to the frame at the back thereof. In case the crawler vehicle is used for the preparation of ski runs, the working tool comprises a tiller assembly, which is dragged by the crawler vehicle on a snowpack of the ski run and comprises a rotary shaft provided with a plurality of teeth to process the snowpack.

BACKGROUND

A relatively ideal preparation of a ski run involves processing the snowpack by the tiller assembly carried by the crawler vehicle to eliminate possible unevenness of the snowpack and make the snowpack relatively aesthetically appreciable.

During the processing of the snowpack, to follow the conformation of the ski run as efficiently as possible, the crawler vehicle needs to make turns, which can have a relatively extremely variable radius. Therefore, known crawler vehicles comprise a connection between the frame and the working tool, which allows the working tool to rotate relative to the frame, so as to prevent the working tool from creating resistances along bends, thus determining a scarce snowpack finishing quality.

European Patent No. 1,405,782 discloses a control system to selectively control the angular position of the working tool connected to the crawler vehicle at the back thereof along bends. In particular, the control system described therein, in response to a steering command, automatically causes the rotation of the working tool around a yaw axis, so that the working tool follows the same trajectory as the crawler vehicle to make it easier for it to steer. However, the control system of European Patent No. 1,405,782 is particularly complicated to be used and installed on a known crawler vehicle and is scarcely reliable, especially in case the crawler vehicle is used for the preparation of a ski run with on a slope.

SUMMARY

An object of the disclosure is to provide a crawler vehicle, in particular for the preparation of ski runs, which reduces certain of the drawbacks of certain of the prior art.

In particular, an object of the disclosure is to provide a crawler vehicle provided with a working tool, which can be used in a relatively simple and reliable fashion for the preparation of ski runs on a slope, so as to ensure a relatively ideal quality of the processed snowpack.

According to the disclosure, there is provided a crawler vehicle, in particular for the preparation of ski runs; the crawler vehicle comprising:
a frame extending along a first longitudinal axis;
a first and a second motorized track;
at least one speed sensor to detect a speed difference between the first track and the second track;
a tilt sensor (in certain embodiments) configured to detect a tilt signal indicative of the inclination of the crawler vehicle;
a working tool, which extends transversely and symmetrically with respect to a second longitudinal axis and is hinged at the rear of the frame about a yaw axis;
an actuation system, which is configured to act between the working tool and the frame; and a control device, which is in communication with said at least one speed sensor and, in certain embodiments, with the tilt sensor and comprises a memory configured to store a reference interval for a steering radius of the crawler vehicle, the control device is configured to:
calculate a value of the steering radius of the crawler vehicle, in order to, in certain embodiments, vary the stored reference interval in real time as a function of the detected tilt signal, and
control the actuation system so as to selectively perform at least one of:
enabling the working tool to freely oscillate about the yaw axis when the calculated value of the steering radius is comprised within the reference interval;
keeping the position of the working tool blocked with respect to the frame when the calculated value of the steering radius is outside the reference interval, so that, in certain embodiments, the second longitudinal axis of the working tool is aligned with the first longitudinal axis of the frame.

It should be appreciated that the position of the working tool with respect to the frame can selectively be blocked/released in an automatic, relatively simple and reliable manner, with no need for an intervention of the driver of the crawler vehicle. Furthermore, due to the relative simplicity and reliability of the control device, said control device can be installed on known crawler vehicles.

In more detail, in case the crawler vehicle is used for the preparation of a ski run on a slope and proceeds along a straight trajectory, keeping the position of the working tool blocked, the working tool can be prevented from falling to the side because of its own weight, thus jeopardizing the quality of the processing of the snowpack.

On the contrary, in case the crawler vehicle is used for the preparation of a substantially flat ski run and/or proceeds along a curved trajectory, the free oscillation of the working tool around the frame enables the working tool to follow the same trajectory as the one covered by the crawler vehicle, this avoiding the lateral dragging of the working tool on the snowpack.

A further object of the disclosure is to provide a method to control a crawler vehicle, which reduces certain of the drawbacks of certain of the prior art.

According to the disclosure, there is provided a method to control a crawler vehicle comprising a frame extending along a first longitudinal axis, a first motorized track, a second motorized track, a working tool that extends transversely and symmetrically with respect to a second longitudinal axis and hinged at a rear of the frame about a yaw axis, and an actuation system configured to act between the working tool and the frame, the method comprising:
detecting a speed difference between the first motorized track and the second motorized track;
detecting a tilt signal indicative of an inclination of the crawler vehicle;

storing a reference interval for a steering radius of the crawler vehicle;

calculating a value for the steering radius;

varying, in real time and based on the detected tilt signal, the stored reference interval; and controlling the actuation system to selectively perform at least one of:

enabling a free oscillation of the working tool about the yaw axis when the calculated value of the steering radius is within the reference interval; and keeping the position of the working tool blocked, with respect to the frame and to align the second longitudinal axis of the working tool with the first longitudinal axis of the frame, when the calculated value of the steering radius is outside the reference interval.

BRIEF DESCRIPTION OF THE DRAWINGS

Further features and advantages of the disclosure are defined in the appended dependent claims and will be best understood upon perusal of the following description of a non-limiting embodiment, with reference to the accompanying figures, wherein:

DETAILED DESCRIPTION

Figure 1:
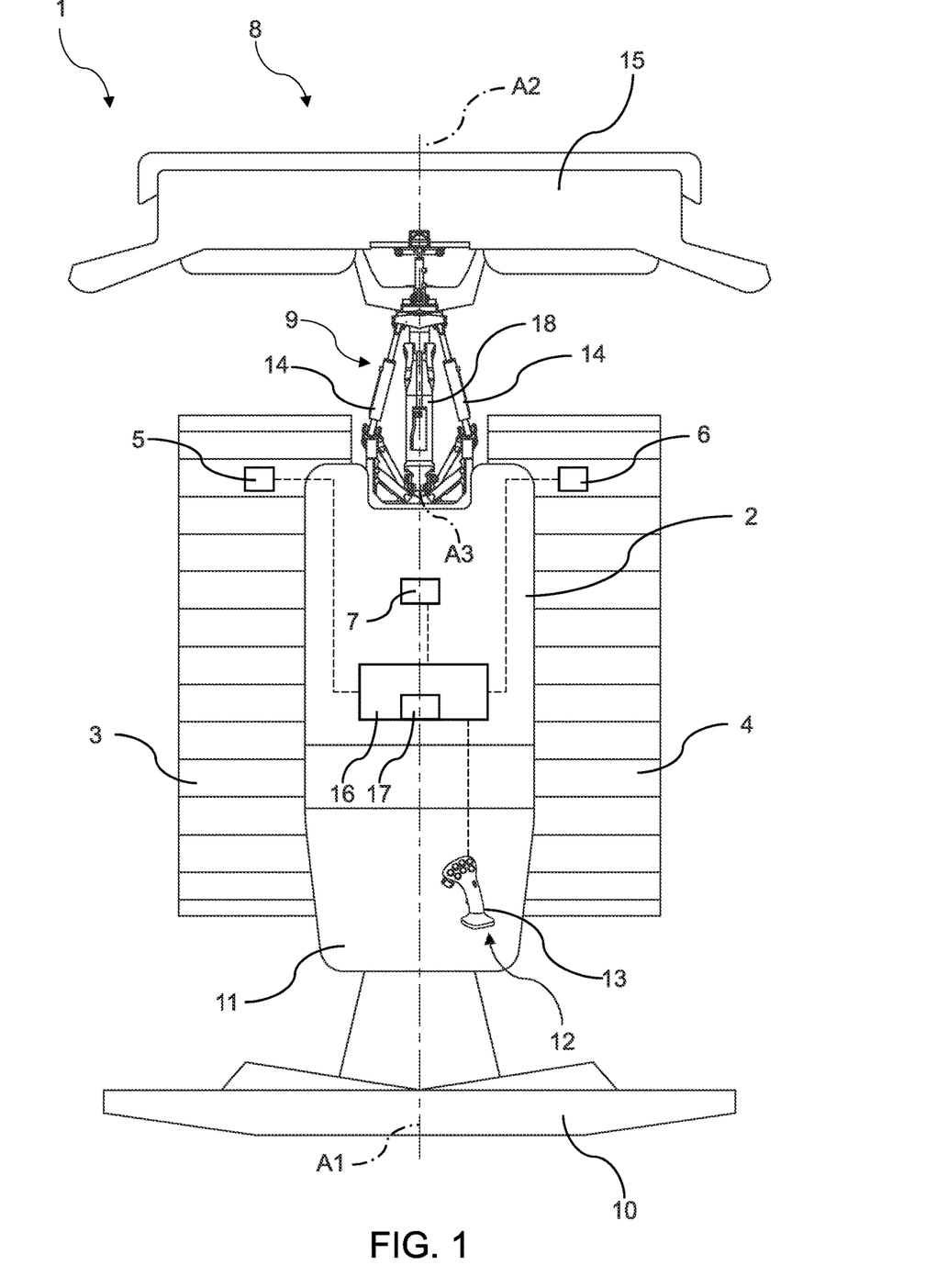
FIG. 1 is a plan view, with parts removed for greater clarity and schematic parts, of a crawler vehicle according to the disclosure.

With reference to FIG. 1, number 1 defines, as a whole, a crawler vehicle, in particular used for the preparation of ski runs.

The crawler vehicle 1 comprises a frame 2 extending along a longitudinal axis A1; a track 3 and a track 4, which are both motorized; a speed sensor 5 and a speed sensor 6, each associated with a respective track 3, 4 to detect a speed signal indicative of the speed of said track 3, 4; a tilt sensor 7 configured to detect a tilt signal indicative of the inclination of the crawler vehicle 1; a working tool 8, which extends transversely and symmetrically with respect to a longitudinal axis A2 and is hinged at the rear of the frame 2 around a yaw axis A3; and an actuation system 9, which is configured to act between the working tool 8 and the frame 2.

In particular, the speed sensors 5 and 6 are configured to detect a speed difference between the track 3 and the track 4.

According to a non-limiting embodiment of the disclosure, each speed sensor 5, 6 is a pressure sensor configured to detect the pressure of a fluid supplied to a respective drive wheel, which determines the movement of a respective track 3 and 4.

In particular, the tilt sensor 7 is configured to detect a pitch of the crawler vehicle 1 around an axis perpendicular to the longitudinal axis A1 and to the yaw axis A3 and to detect a roll of the crawler vehicle 1 around the longitudinal axis A1.

According to a non-limiting embodiment of the disclosure, the tilt sensor 7 is a gyroscope.

Furthermore, the crawler vehicle 1 comprises a shovel 10 mounted at the front on the frame 2; a cabin 11 mounted on the frame 2; and a command unit 12, which is arranged inside the cabin 11, can be operated by an operator of the crawler vehicle 1 and is configured to impart a steering command.

In the example described and shown herein, the command unit 12 comprises a joystick 13.

The actuation system 9 comprises a pair of actuators 14 configured to act in an opposite manner. In particular, each actuator 14 is a pneumatic cylinder hinged, at an end, to the frame 2 and, at the other hand, to the working tool 8.

In particular, the working tool 8 comprises an elongated arm 18, which extends along the longitudinal axis A2 and is hinged, at an end, to the frame 2 around the yaw axis A3.

In the non-limiting embodiment of the disclosure described and shown herein, the working tool 8 comprises a tiller assembly 15 to process a snowpack of a ski run. In particular, the tiller assembly 15 comprises a rotary shaft (which is not shown in the figures), provided with a plurality of teeth (which are also not shown in the figures) to process the snowpack.

In the configuration shown in FIG. 1, the crawler vehicle 1 is a snow groomer.

More in detail, the crawler vehicle 1 is used for the preparation of ski runs for Alpine skiing and/or ski runs for cross-country skiing and/or ramps for ski jumping and/or half-pipes and/or snow-parks.

According to a further embodiment (not shown in the figures), the crawler vehicle 1 can be used in agricultural operations, such as, for example, the harvesting and/or the handling of agricultural products and/or the ensilage of fodder and/or the harvesting and/or the handling of bagasse. In this configuration, the working tool 8 is configured to process the agricultural products laid on the ground. Furthermore, according to a further embodiment (which is not shown in the figures), the crawler vehicle 1 comprises a mulcher arranged on the front side of the vehicle and can be used to mulch plants.

With reference to FIG. 1, the crawler vehicle 1 comprises a control device 16, which is in communication with the speed sensors 5 and 6 and with the tilt sensor 7 and comprises a memory 17 configured to store a reference interval for a steering radius of the crawler vehicle 1.

The control device 16 is configured to calculate a value of the steering radius of the crawler vehicle 1 to, in certain embodiments, vary the stored reference interval in real time as a function of the detected tilt signal, and to control the actuation system 9 so as to selectively:

enable the working tool 8 to freely oscillate about the yaw axis (A3) when the calculated value of the steering radius is comprised within the reference interval; and keeping the position of the working tool 8 blocked with respect to the frame 2 when the calculated value of the steering radius is outside the reference interval, so that the longitudinal axis A2 of the working tool 8 is aligned with the longitudinal axis A1 of the frame 2.

In particular, the command unit 12 is in communication with the control device 16 so as to transmit, to the control device 16, a steering signal indicative of the imparted steering command.

Figure 2:
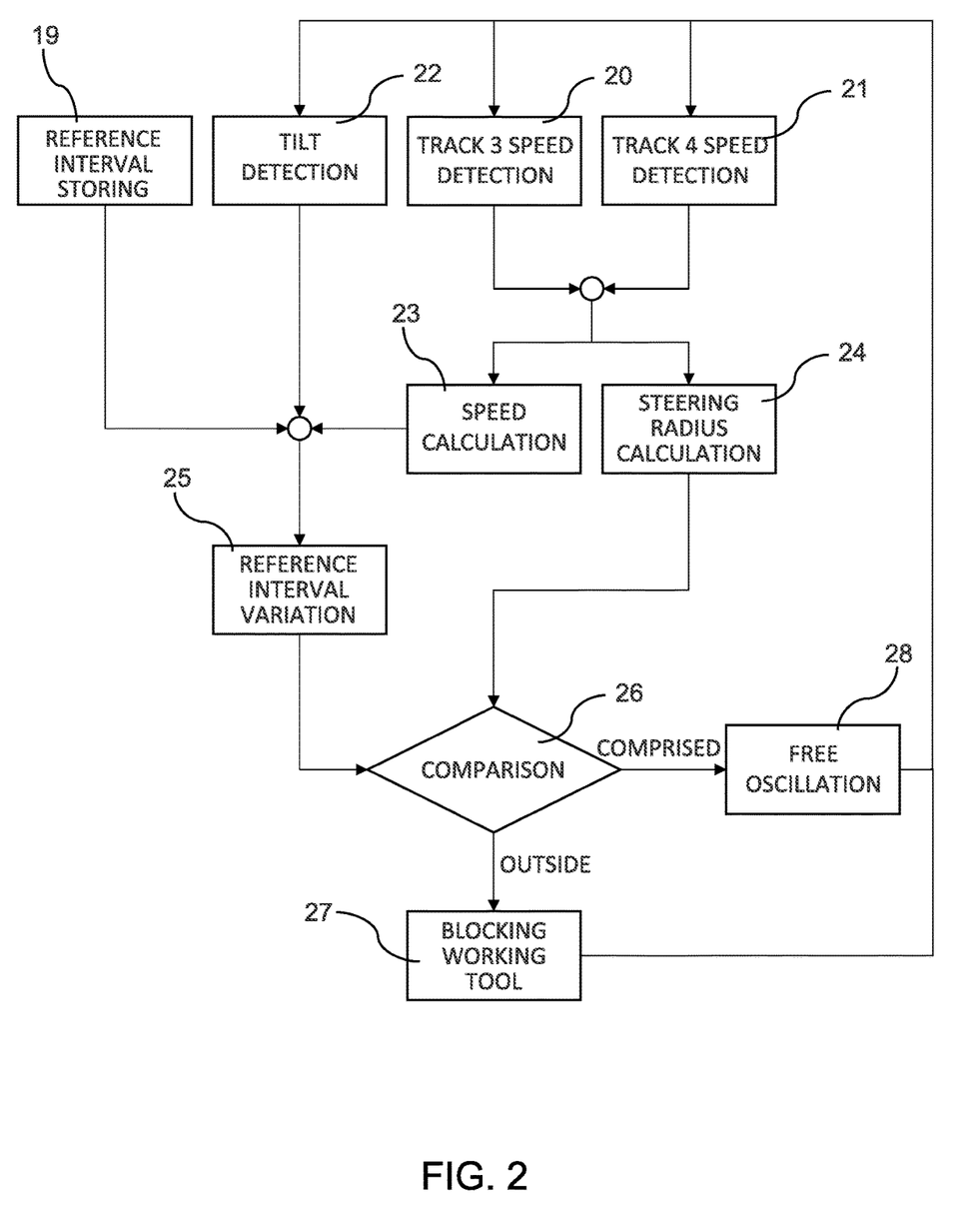
FIGS. 2 and 3 are flow diagrams of respective embodiments of the crawler vehicle of FIG. 1.

With reference to FIG. 2, the control device 16 is configured to calculate the value of the steering radius as a function of the speed signals detected by the speed sensors 5 and 6 and to control the actuation system 9 as a function of said speed signals.

Furthermore, the control device 16 is configured to vary the stored reference interval in real time as a function of the speed signals detected by the speed sensors 4 and 5.

Figure 3:
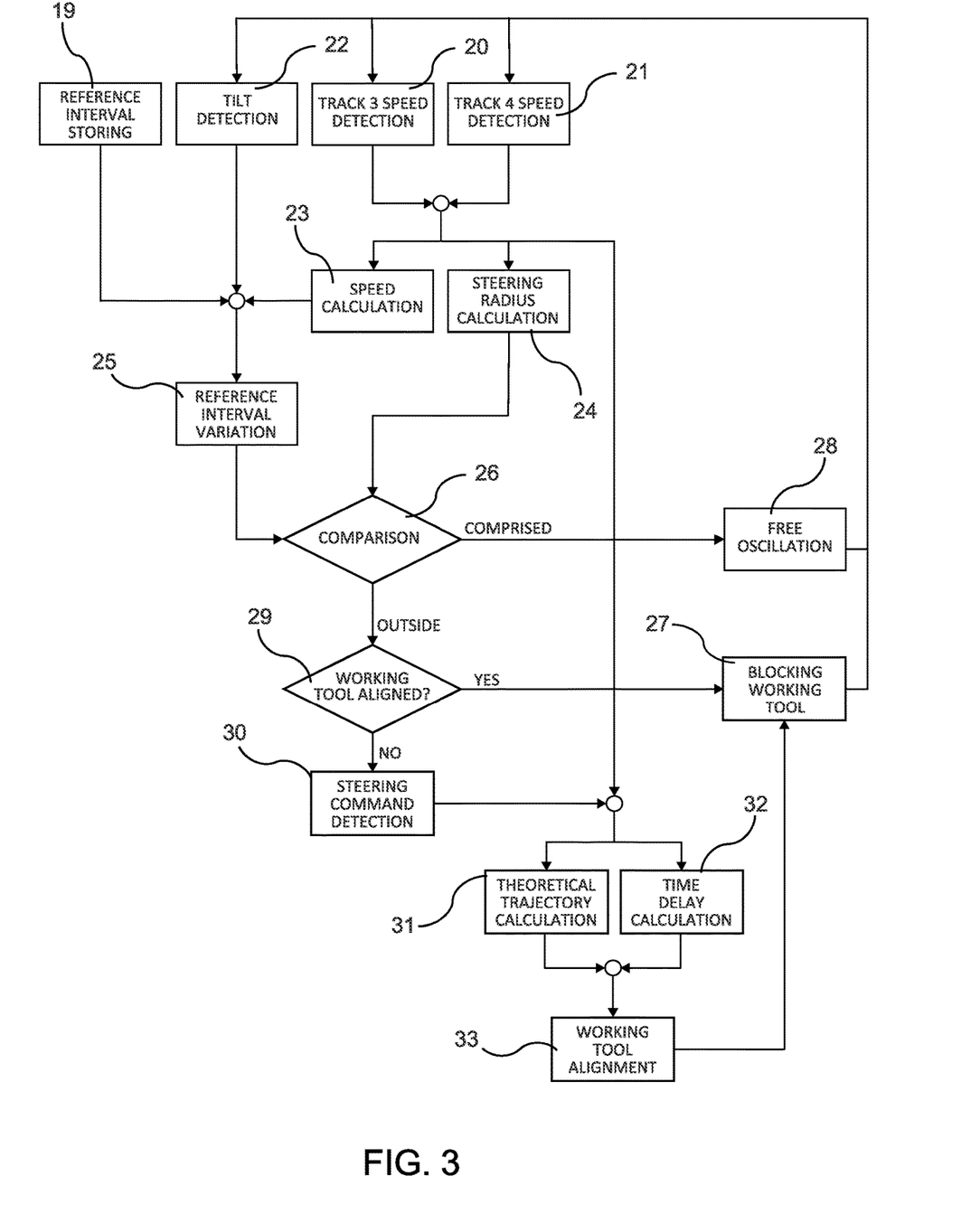

With reference to FIG. 3, the control device 16 is configured to control the actuation system 9 so as to selectively bring the working tool 8 gradually back into alignment with the frame 2 when the value of the calculated steering radius does not fall within the reference interval.

The control device 16 is configured to align the longitudinal axis A2 of the working tool 8 with the longitudinal axis A1 of the frame 2. In particular, the control device 16 is configured to calculate a theoretical steering trajectory as a function of the imparted steering command and of the detected speed signals and to control the actuation system 9 so as to selectively bring the working tool 8 back into alignment with the frame 2 following said calculated theoretical trajectory when the calculated value of the steering radius does not fall within the reference interval.

In more detail, the control device 16 is configured to calculate, as a function of the detected speed signals, a time delay interval, which elapses between the time instant in which the calculated value of the steering radius falls within the reference interval and the time instant of activation of the actuation system 9 to bring the working tool 8 back into alignment with the frame 2. The control device 16 is configured to control the actuation system 9 with a delay equal to the calculated time delay interval.

In use and with reference to FIG. 2, a reference interval for a steering radius of the crawler vehicle 1 is stored in the memory 17 (block 19). In particular, said reference interval is defined for the purpose of preventing the activation of the actuation system 9 with every relatively small steering correction by a driver of the crawler vehicle 1.

While the crawler vehicle 1 proceeds on a ski run to be processed, the speed sensors 5 and 6 detect the speed of the tracks 3 and 4 respectively (blocks 20 and 21) and the tilt sensor 7 detects the inclination of the crawler vehicle 1 (block 22). In particular, the inclination sensor 7 detects a pitch angle and a roll angle, each defined with respect to a Cartesian reference system having two axes belonging to an ideal horizontal plane.

The control device 16 calculates a moving speed (block 23) of the crawler vehicle 1 and a steering radius value (block 24) of the crawler vehicle 1 as a function of the detected speeds of the tracks 3 and 4.

Subsequently, starting from the stored reference interval, the control device 16 calculates a variation in the reference interval (block 25) as a function of the detected inclination of the crawler vehicle 1 and of the calculated speed of the crawler vehicle 1.

By way of example, when the crawler vehicle 1 proceeds downhill along a ski run on a slope, the control device 16 reduces the reference interval with respect to the situation in which the crawler vehicle 1 moves along a substantially flat ski run, so as to prevent the working tool 8 from falling to the side because of its own weight.

On the contrary, as the moving speed of the crawler vehicle 1 increases, the control device 16 widens the reference interval in order to avoid excess stresses for the working tool 8.

At this point, the control device 16 compares the calculated steering radius value with the reference interval (block 26).

In case the calculated value of the steering radius is outside the reference interval, the control device 16 controls the actuators 14 so as to keep the position of the working tool 8 with respect to the frame 2 blocked (block 27). In particular, the actuators 14 keep the longitudinal axis A2 of the working tool 8 aligned with the longitudinal axis A1 of the frame 2.

On the contrary, in case the calculated value of the steering radius is within the reference interval, the control device 16 controls the actuators 14 so as to enable or allow the working tool 8 to freely oscillate around the yaw axis A3 (block 28).

With reference to FIG. 3, in case the calculated value of the steering radius is outside the reference interval, the control device 16 evaluates whether the longitudinal axis A2 of the working tool 8 is aligned with the longitudinal axis A1 of the frame 2 (block 29).

If the longitudinal axis A2 of the working tool 8 is aligned with the longitudinal axis A1 of the frame 2, the control device 16 controls the actuators 14 so as to keep the position of the working tool 8 with respect to the frame 2 blocked (block 27).

If the longitudinal axis A2 of the working tool 8 is not aligned with the longitudinal axis A1 of the frame 2, the control device 16 detects the steering command (block 30) imparted by the command unit 12.

Subsequently, the control device 16 calculates a theoretical steering trajectory (block 31) and a time delay interval (block 32) as a function of the speed signals detected by the speed sensors 5 and 6 and as a function of the detected steering command.

In particular, the time delay interval elapses between the time instant in which the calculated value of the steering radius falls within the reference interval and the time instant of activation of the actuation system 9 to bring the working tool 8 back into alignment with the frame 2. Said time delay interval has the function of preventing the working tool 8 from going back into alignment with the frame 2 too quickly, thus determining a scarce quality of processing of the snowpack.

Once the time delay interval and the theoretical steering trajectory have been calculated, the control device 16 activates the actuators 14 so as to bring the working tool 8 back into alignment with the frame 2 (block 33) following said theoretical trajectory calculated with a delay that is equal to the calculated time delay interval.

At this point, the control device 16 controls the actuators 14 so as to block the position of the working tool 8 with respect to the frame 2 (block 27).

Figure 4:
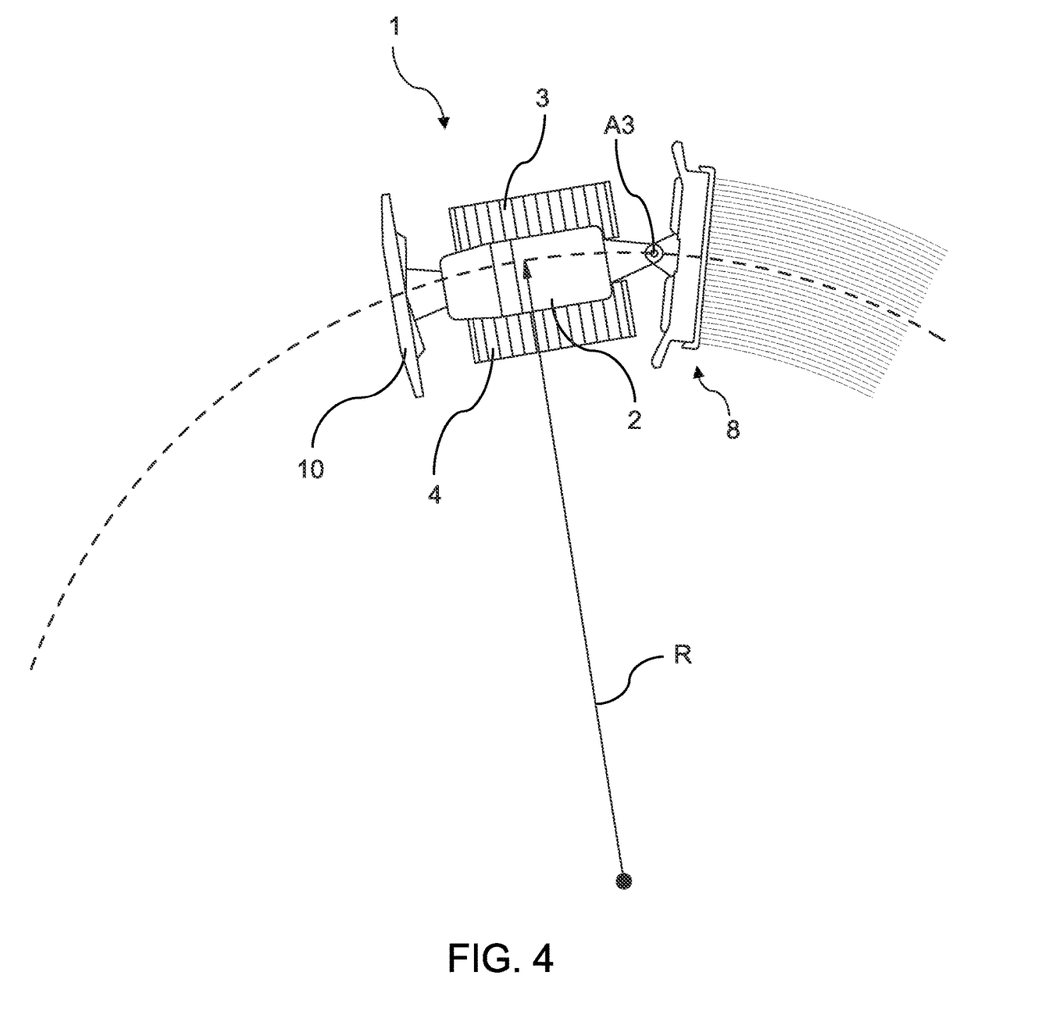
FIG. 4 is a schematic view of the crawler vehicle of FIG. 1 in a particular operating configuration.

FIG. 4 shows the crawler vehicle 1 while driving along a bend with a steering radius R, which is comprised within the reference interval. In this operating configuration, the working tool 8 is free to oscillate around the yaw axis A3 so as to follow the trajectory of the bend.

Figure 5:
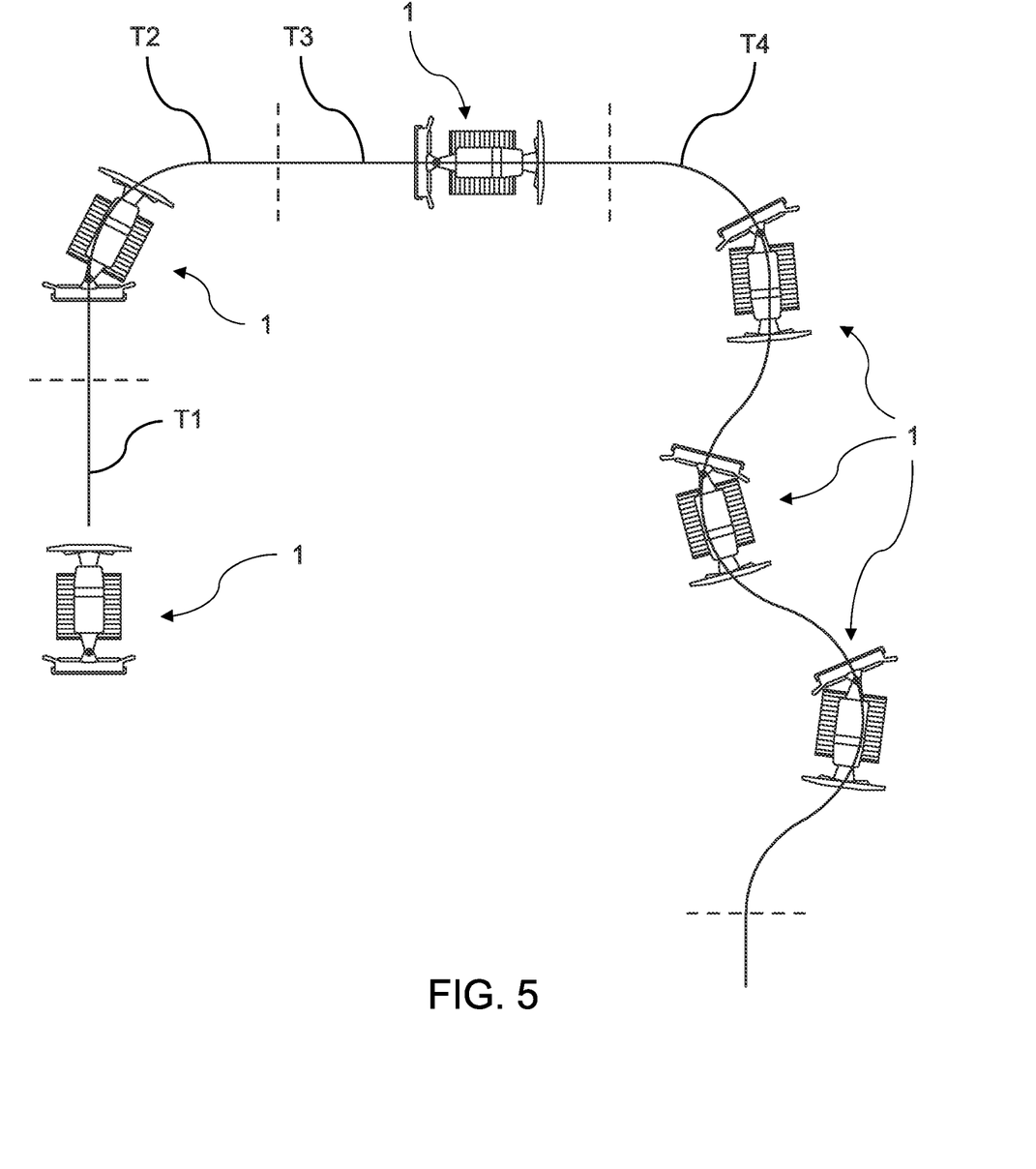
FIG. 5 is a schematic view of the crawler vehicle of FIG. 1 driving along a given trajectory.

FIG. 5 shows the crawler vehicle 1 while moving along a given or designated trajectory having a plurality of segments T1, T2, T3 and T4.

In particular, along the straight segment T1, the actuation system 9 keeps the position of the working tool 8 blocked with respective to the frame 2. Under this circumstance, the longitudinal axis A2 of the working tool 8 is aligned with the longitudinal axis A1 of the frame 2.

Along the curved segment T2, the value of the steering radius is within the reference interval and the control device 16 controls the actuation system 9 so as to enable the working tool 8 to freely oscillate around the yaw axis A3.

When shifting from the curved segment T2 to the straight segment T3, the value of the steering radius is outside the reference interval. Under this circumstance, the control device 16 controls the actuation system 9 so as to gradually bring the working tool 8 back into alignment with the frame 2. In particular, the control device 16 controls the actuation system 9 so as to bring the working tool 8 back into alignment with the frame 2 following a calculated theoretical trajectory and with a delay that is equal to a calculated time delay interval.

Once they are aligned, the actuation system 9 keeps the position of the working tool 8 blocked with respect to the frame 2 for the entire length of the straight segment T3.

Along the segment T4, the value of the steering radius goes back to falling within the reference interval and, as a consequence, the control device 16 controls the actuation system 9 so as to enable again the working tool 8 to freely oscillate around the yaw axis A3. In this way, the working tool 8 is capable of following the trajectory determined by the series of bends in succession of the segment T4.

Finally, the disclosure can evidently be subjected to variants, though without going beyond the scope of protection set forth in the appended claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A crawler vehicle comprising:
a frame extending along a first longitudinal axis;
a first motorized track;
a second motorized track;
a tilt sensor configured to detect a tilt signal indicative of an inclination of the crawler vehicle;
a working tool that extends transversely and symmetrically with respect to a second longitudinal axis, the working tool being hinged at a rear of the frame about a yaw axis;
an actuation system configured to act between the working tool and the frame; and
a control device in communication with the tilt sensor, the control device comprising a memory that stores a reference interval for a steering radius of the crawler vehicle, the control device configured to:
calculate a value for the steering radius of the crawler vehicle to vary, in real time and based on the detected tilt signal, the stored reference interval, and
control the actuation system to selectively perform at least one of:
enabling a free oscillation of the working tool about the yaw axis when the calculated value of the steering radius is within the reference interval, and
keeping the position of the working tool blocked, with respect to the frame and to align the second longitudinal axis of the working tool with the first longitudinal axis of the frame, when the calculated value of the steering radius is outside the reference interval.

2. The crawler vehicle of claim 1, wherein the control device is configured to control the actuation system to selectively bring the working tool back into alignment with the frame when the value of the calculated steering radius exits from the reference interval.

3. The crawler vehicle of claim 1, wherein the control device is configured to calculate the value of the steering radius based on a speed difference between the first motorized track and the second motorized track.

4. The crawler vehicle of claim 1, further comprising a first speed sensor associated with the first motorized track and configured to detect a first speed signal indicative of a first speed of the first motorized track and a second speed sensor associated with the second motorized track and configured to detect a second speed signal indicative of a second speed of the second motorized track, wherein the control device is configured to control the actuation system based on the first speed signal detected by the first speed sensor, and the second speed signal detected by the second speed sensor.

5. The crawler vehicle of claim 4, wherein the control device is configured to:
calculate, based on the first speed signal and the second speed signal, a time delay interval that elapses between a first time instant when the calculated value of the steering radius falls within the reference interval and a second time instant of an activation of the actuation system to bring the working tool back into alignment with the frame, and
control the actuation system with a delay equal to the calculated time delay interval.

6. The crawler vehicle of claim 1, wherein the control device is configured to vary the stored reference interval in real time and based on a speed difference between the first motorized track and the second motorized track.

7. The crawler vehicle of claim 1, further comprising a command unit in communication with the control device and operable, by an operator of the crawler vehicle, to impart a steering command.

8. The crawler vehicle of claim 7, wherein the control device is configured to:
calculate a theoretical steering trajectory based on the steering command and a speed difference between the first motorized track and the second motorized track, and
control the actuation system to selectively bring the working tool back into alignment with the frame based on the calculated theoretical trajectory when the calculated value of the steering radius exits from the reference interval.

9. The crawler vehicle of claim 1, wherein the actuation system comprises a pair of actuators configured to act in opposition.

10. The crawler vehicle of claim 1, wherein the working tool comprises a tiller assembly configured to process a snowpack.

11. A method of controlling a crawler vehicle comprising a frame extending along a first longitudinal axis, a first motorized track, a second motorized track, a working tool that extends transversely and symmetrically with respect to a second longitudinal axis and hinged at a rear of the frame about a yaw axis, and an actuation system configured to act between the working tool and the frame, the method comprising:
detecting a speed difference between the first motorized track and the second motorized track;
detecting a tilt signal indicative of an inclination of the crawler vehicle;
calculating a value for a steering radius of the crawler vehicle;
varying, in real time and based on the detected tilt signal, a reference interval for the steering radius of the crawler vehicle; and
controlling the actuation system to selectively perform at least one of:
enabling a free oscillation of the working tool about the yaw axis when the calculated value of the steering radius is within the reference interval; and keeping the position of the working tool blocked, with respect to the frame and to align the second longitudinal axis of the working tool with the first longitudinal axis of the frame, when the calculated value of the steering radius is outside the reference interval.

12. The method of claim 11, further comprising controlling the actuation system to selectively bring the working tool back into alignment with the frame when the value of the calculated steering radius exits from the reference interval.

13. The method of claim 11, further comprising:
calculating the value of the steering radius based on the speed difference between the first motorized track and the second motorized track;
detecting, for each motorized track, a speed signal indicative of a speed of that motorized track; and
controlling the actuation system based on the detected speed signals.

14. The method of claim 13, further comprising:
calculating, based on the detected speed signals, a time delay interval which elapses between a first time instant when the calculated value of the steering radius falls within the reference interval and a second time instant of an activation of the actuation system to bring the working tool back into alignment with the frame; and
controlling the actuation system with a delay equal to the calculated time delay interval.

15. The method of claim 11, further comprising varying, in real time and based on the speed difference between the first motorized track and the second motorized track, the reference interval.

16. The method of claim 11, further comprising:
imparting a steering command by a command unit;
calculating a theoretical steering trajectory based on the speed difference between the first motorized track and the second motorized track; and
controlling the actuation system to selectively bring the working tool back into alignment with the frame based on the calculated theoretical trajectory when the calculated value of the steering radius exits from the reference interval.

17. A non-transitory computer-readable medium that stores a plurality of instructions that, when executed by a control device of a crawler vehicle comprising a frame extending along a first longitudinal axis, a first motorized track, a second motorized track, a working tool that extends transversely and symmetrically with respect to a second longitudinal axis and hinged at a rear of the frame about a yaw axis, and an actuation system configured to act between the working tool and the frame, cause the control device to:
detect a speed difference between the first motorized track and the second motorized track;
detect a tilt signal indicative of an inclination of the crawler vehicle;
calculate a value for a steering radius of the crawler vehicle;
vary, in real time and based on the detected tilt signal, a reference interval for the steering radius of the crawler vehicle; and
control the actuation system to selectively perform at least one of:
enabling a free oscillation of the working tool about the yaw axis when the calculated value of the steering radius is within the reference interval; and
keeping the position of the working tool blocked, with respect to the frame and to align the second longitudinal axis of the working tool with the first longitudinal axis of the frame, when the calculated value of the steering radius is outside the reference interval.

* * * * *